United States Patent [19]

Rosenplanter et al.

[11] Patent Number: 5,074,470
[45] Date of Patent: Dec. 24, 1991

[54] VALVING ROD WITH SCRAPER DEVICE FOR FOAM DISPENSING APPARATUS

[75] Inventors: William F. Rosenplanter, Wallingford; John F. Zwirlein, Jr., New Haven; James R. Noel, Hamden; Thomas P. Patrosh, Wallingford, all of Conn.

[73] Assignee: Olin Corporation, Cheshire, Conn.

[21] Appl. No.: 459,505

[22] Filed: Jan. 2, 1990

[51] Int. Cl.$^5$ .............................................. B05B 15/02
[52] U.S. Cl. ...................................... 239/116; 239/123
[58] Field of Search ............... 239/112, 114, 115, 116, 239/117, 123; 222/149

[56] References Cited

U.S. PATENT DOCUMENTS

| | | | |
|---|---|---|---|
| 2,890,836 | 6/1959 | Gusmer et al. | 239/117 |
| 3,144,210 | 8/1964 | Levy | 239/116 X |
| 3,203,630 | 8/1965 | Broughton | 239/116 |
| 3,334,648 | 8/1967 | Probst | 137/238 |
| 3,687,370 | 8/1972 | Sperry | 239/117 X |
| 3,786,990 | 1/1974 | Hagfors | 239/117 X |
| 3,876,145 | 4/1975 | Gusmer et al. | 239/112 |
| 3,945,569 | 3/1976 | Sperry | 239/117 X |
| 4,003,501 | 1/1977 | Ramazzotti et al. | 222/149 X |
| 4,377,256 | 3/1983 | Commette et al. | 239/117 |
| 4,427,153 | 1/1984 | Schaefer | 239/117 |
| 4,523,696 | 6/1985 | Commette et al. | 239/117 X |

Primary Examiner—Andres Kashnikow
Assistant Examiner—William Grant
Attorney, Agent, or Firm—Ralph D'Alessandro

[57] ABSTRACT

A composite valving rod is provided for use in a foam dispensing apparatus having a low friction plastic sleeve portion that is retained by a steel tip which both maintains the physical dimensions of the plastic sleeve and serves as a scraper when drawn through the bore of the foam dispensing cartridge. The cartridge is all metal.

19 Claims, 2 Drawing Sheets

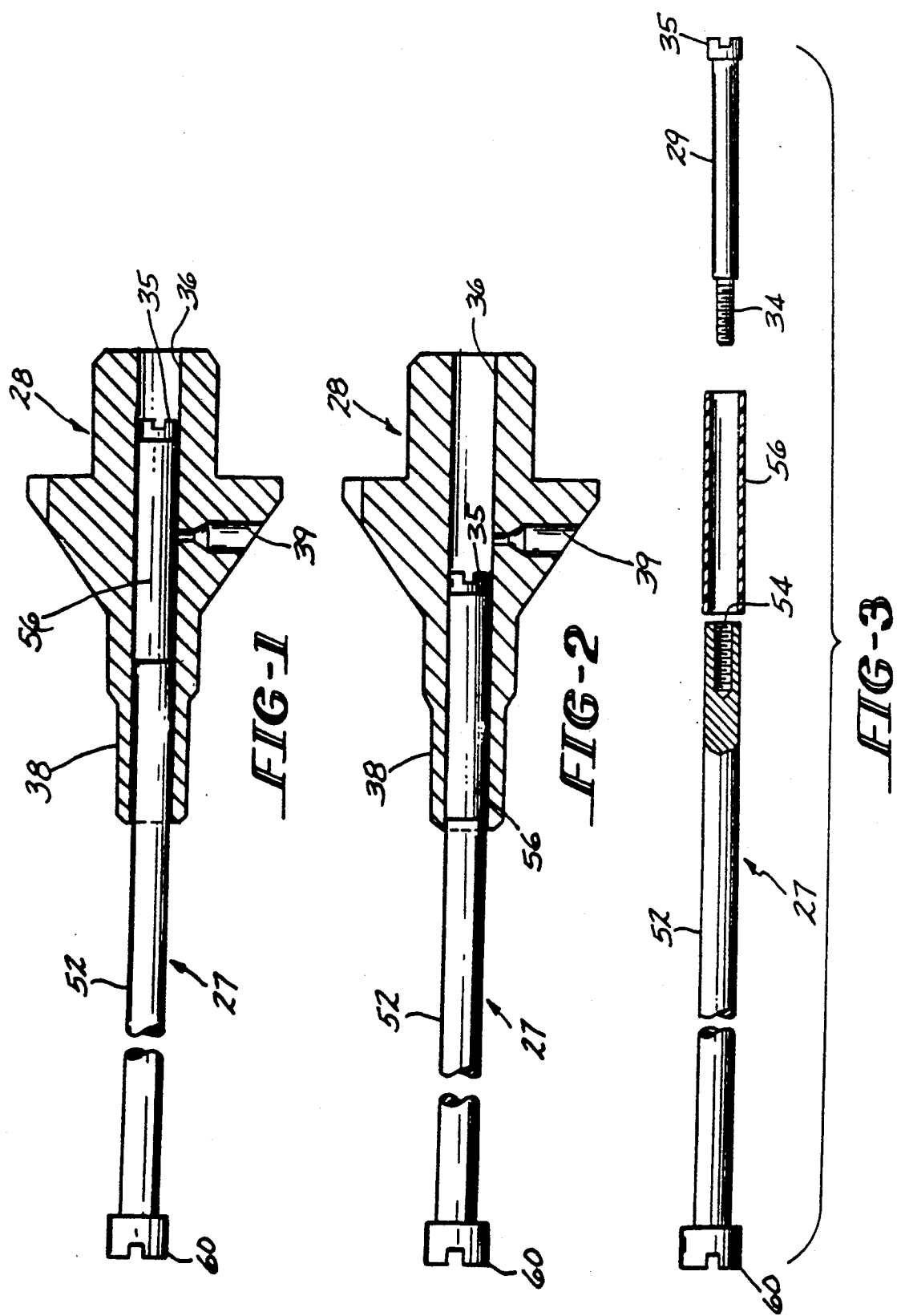

VALVING ROD WITH SCRAPER DEVICE FOR FOAM DISPENSING APPARATUS

The present invention relates generally to apparatus used to dispense a plurality of liquids through a single orifice, and more particularly to apparatus to prevent and remove the build up of polyurethane foam from the dispensing orifice of a foam dispenser.

Polyurethane foams are formed by the reaction of an isocyanate component and hydroxyl-bearing compounds. When mixed in the presence of a catalyst, a surfactant, and a blowing agent, these chemicals react to form cellular cross-linked polymer chains, more commonly known as a polyurethane foam. Each of these components of the plural component material, by itself, is generally stable. Thus, each component will not cure or cross-link for extended periods of time, often as long as several months, if they are properly stored. However, when the isocyanate component and the polyol component, a preformulated compound that includes a surfactant, a catalyst and a blowing agent, are mixed together in proper proportions, an exothermic chemical reaction of the isocyanate and polyol occurs. This reaction causes a continued expansion that is evidence of the polymerization and manifests itself as foam which cross-links and cures. The cross-linking and curing usually is substantially completed in a matter of seconds.

Polyurethane foam dispensers are well known and have achieved a high degree of usage in factories where components must be adhesively lined with an insulating foam or where products must be packaged and protected from damage during shipment. This high level of use of polyurethane foam dispensing equipment has also focused attention on the efficiency of prior apparatus employed to accomplish this dispensing. Many of the problems with foam dispensing equipment stem from the fact that the polyurethane foam "sets" or builds up in the dispenser, normally within the mixing chamber or the nozzle, after the chemical components have cross-linked and begun to cure. This "setting" can eventually cause the apparatus to become inoperative due to clogging or blockage of the flow passages.

In operations such as those required during packaging, where intermittent use of the dispensing apparatus is normal, the "setting" problem is more severe. This typically occurs in the situation where a packer initially directs a "shot" of the mixed plural components into the bottom of the container, inserts a polyethylene strip over the top of the foam shot, and places the product to be shipped in the container. Another sheet of polyethylene is placed on top of the product, and the foam dispensing apparatus is then activated after a delay of 10 to 20 seconds from the time the first "shot" was dispensed to fill the box with the cushioning foam. This procedure is repeated for each item to be packed.

Prior foam dispensing apparatus has attempted to solve this "setting" problem by using either separately or combinatively air blasts, cleaning rods or plungers cooperative with stationary scrapers, or solvent to remove the residue foam from the dispensing assembly. Specific polyurethane foam systems have attempted to use air with pressurized solvent blown into the mixing chamber and the dispensing nozzle, an automatic solvent flush that runs through the mixing chamber and dispensing nozzle, a blast of purging gas preceding the continuous pumping of solvent through the mixing chamber and dispensing nozzle, and reciprocating cleaning rods or plungers which may or may not use the solvent to facilitate the scraping of residue foam from the dispensing apparatus.

The use of a combination cleaning rod and valving rod to control the flow of the polyol and isocyanate components has proven to be the most common design employed in commercial applications. Since most of the clogging from foam buildup occurs within the mixing chamber or nozzle, designs have evolved employing removable mixing chambers and dispensing nozzle members.

Some designs have employed levers which permit the nozzle or mixing chamber cartridge to be removed from the dispensing gun. Once these components are removed from the dispensing guns, they are frequently soaked in solvent to reduce or remove the residue foam. The solvent, however can attack gaskets or O-ring seals in the components and ruin the tight fit of the seals necessary for successful operation. Alternately the interior of the nozzles can be scored, and therefore ruined when the set up foam is attempted to be removed by reaming with a metal or other abrasive tool.

Other designs have employed a TEFLON ® plastic core in the mixing nozzle or cartridge to overcome cold forming problems that typically result when the core material gradually changes shape under loading to reduce the stress. Cold forming problems affect the tight sealing necessary in interference fittings with the valving rods, thereby permitting the leakage of the isocyanate and polyol components. The mixing nozzle is restrained at each end of the core in both an axial and a radial direction. Another design has employed a detachable mixing chamber and a valving rod as one integral unit.

Alternate approaches employed an all TEFLON ® plastic valving rod with a TEFLON plastic core nozzle and a resilient plastic valving rod sleeve about a metal core reciprocating in a resilient, low friction scraping bushing in an attempt to avoid clogging or freezing up the valving rod within the bore or dispensing orifice of the nozzle. However, these approaches also proved susceptible to cold forming problems.

All of these units with removable mixing chambers suffer from the deficiency of having mixing chambers that are large and costly, or which require the disposal of both the mixing chamber and the valving rod should failure of one component occur. It appeared to be the norm to have TEFLON ® or other plastic parts in the stationary nozzle element and metal parts in the moving valving rod.

These problems are solved in the design of the present invention by providing in a plural component dispensing assembly a composite valving rod for use in a dispensing cartridge having a scraper device on the valving rod to remove build up foam from within the bore of the dispensing nozzle during normal operation.

SUMMARY OF THE INVENTION

It is an object of the present invention to provide a valving rod with a scraper device that removes built up or "set" foam from the dispensing cartridge's orifice during the normal reciprocation of the valving rod within the bore of the cartridge.

It is a feature of the present invention that the composite valving rod has a low friction plastic sleeve portion that is retained by a steel tip that both maintains the physical dimensions of the plastic sleeve and which serves as a scraper when drawn through the bore of the dispensing cartridge.

It is another feature of the present invention that the dispensing cartridge is all metal and provides greater uniformity of the critical design angles and tolerances in manufacturing production quantities of the cartridge.

It is an advantage of the present invention that the composite valving rod with the scraper device is low cost, simple in design and easily replaceable.

It is another advantage of the present invention that the wear susceptible component, the composite valving rod, of the dispensing cartridge/valving rod combination is easily replaceable.

It is yet another advantage of the present invention that improved mixing of the isocyanate and polyol flow streams is obtained in the dispensing apparatus employing the all metal dispensing cartridge/composite valving rod combination because of the higher quality metal cartridge and more accurately aligned impingement vertex of the two flow streams.

These and other objects, features and inventions are obtained in the composite valving rod and dispensing cartridge combination employed in the foam dispensing apparatus wherein the valving rod employs a low friction plastic sleeve portion that is retained in position by a steel tip which functions both as a scraper and a maintainer of the physical dimensions of the plastic sleeve during operation.

DESCRIPTION OF THE DRAWINGS

The advantages of this invention will become apparent upon consideration of the following detailed disclosure of the invention, especially when it is taken in conjunction with the accompanying drawings wherein:

FIG. 1 is a cross-sectional side elevational view of the valving rod within the cartridge mixing chamber with the valving rod in the closed position to prevent or shutdown the flow of the plural components into the mixing chamber;

FIG. 2 is a cross-sectional side elevational view of the valving rod within the cartridge mixing chamber with the valving rod positioned in the open position to permit the flow of the plural components into the mixing chamber;

FIG. 3 is a side elevational exploded view of the composite valving rod with the low friction material sleeve and a portion of the central shaft shown in section.

DETAILED DESCRIPTION OF THE PREFERRED EMBODIMENT

Figure 4:
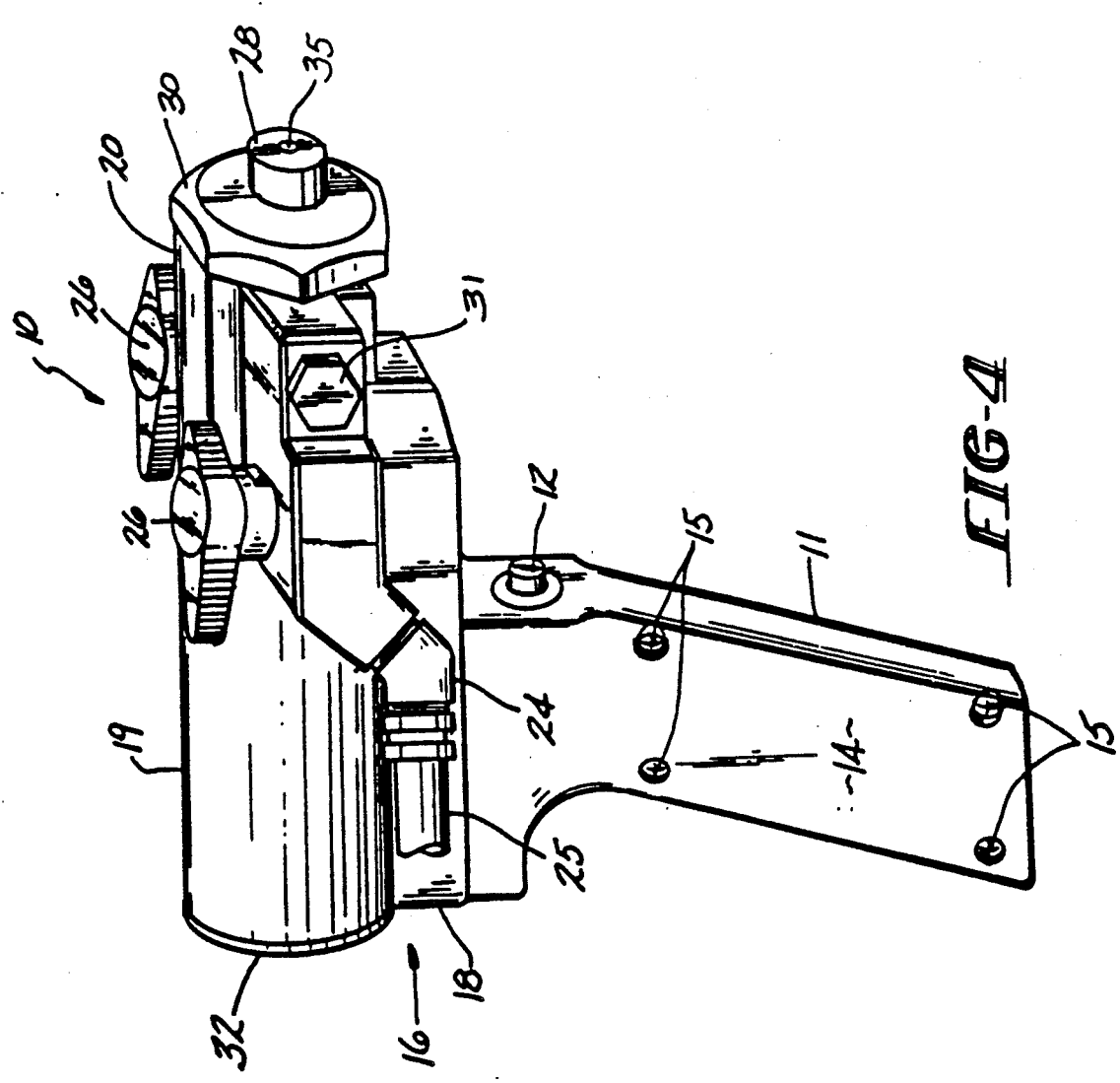
FIG. 4 is a side perspective view of a plural component dispensing apparatus with one of the fluid component hoses partially shown employing the dispensing cartridge/valving rod combination of the present invention.

FIG. 4 shows the side perspective view of a plural component dispensing assembly, indicated generally by the numeral 10. Assembly 10 consists of a grip handle 11 and an upper gun portion, indicated generally by the numeral 16. Handle 11 has a trigger 12 which may be an electric trigger switch or an air spool type of a trigger switch to activate the internal mechanisms within the assemble 10 to permit the flow of plural components. Handle side covers 14 may be attached to the handle 11, such as by means of handle side cover retaining screws 15. The handle 11 is appropriately secured to the base 18 of the upper gun portion 16, such as with bolts or mechanically interlocking parts.

The upper gun portion 16 has a cylinder 19 threaded into a valve block 20. A polyol component fitting 24, with the polyol fluid hose 25 (partially shown), feeds into the valve block 20 to supply one of the plural components to the assembly 10. The polyol component passes from the fitting 24 through flow passages in the valve block 20 to the mixing chamber in the bore 36 of cartridge 38, see briefly FIGS. 1 and 2. A plug or shutoff valve 26 seen in FIG. 1, as well as a filter plug cap 31, are used in the polyol component feed path to control the flow of polyol as well as to provide access to filter screens (not shown) which remove any impurities from the flow stream. Comparable structures exist on the opposite side of the assembly 10 for the isocyanate fluid component. The nozzle, indicated generally by the number 28, is shown protruding through the end of a nozzle retaining cap 30, which is screwed into place to retain the nozzle 28 in position. The scraper stop 35 of valving rod 29 is partially seen extending through the nozzle in FIG. 4. The cylinder 19 has an end closure cap 32.

Cylinder 19 has a main body that is generally cylindrical with a diameter size that can be selected according to the task to be performed and the foam output desired. Similarly the diameter of the valving rod 29 and the length of the nozzle 28 can also be varied. Cylinder 19 has a threaded portion (not shown) which fits within internally threaded valve block recessed (also not shown) portion. A rod bushing and seal (both not shown) are press fitted within the threaded portion of cylinder 19 Once thus threaded into the recessed portion, the cylinder 19 is fastened to the valve block 20.

Cylinder 19 has a piston assembly (not shown), that fits inside. The piston assembly is pneumatically driven and includes a hollow or solid cylinder shaft 52 into which is threaded the valving rod 29 on one end. The other end of shaft 52 has the lock knob 60. Shaft 52 has an internally threaded recessed portion 54 which permits the valving rod 29 to seat therein on the opposite end from the lock knob 60.

The valving rod assembly, indicated generally by the numeral 27 in FIG. 3 has been partially described above. As described, the valving rod assembly 27 includes the shaft 52 and the valving rod 29. Shaft 52 has the end of the internally threaded recessed portion 54 serve as one stop for the low friction plastic sleeve 56 that fits over the outer dimension or diameter of the valving rod 29. Rod 29 has threaded portion 34 that fits into the hollow internally threaded recessed portion 54 of shaft 52. On the opposing end of valving rod 29 is scraper stop 35 that has a larger diameter or outer dimension than the main shaft of valving rod 29, for example by about 0.0675 inches, and serves to retain the low friction plastic sleeve 56 on the opposing end from the hollow recessed portion 54. Sleeve 56 is hollow and fits about the shaft portion of valving rod 29 and is slightly larger in diameter than the scraper stop 35 and the cylinder shaft 52, for example by about 0.0015 inches. The outer diameter of scraper stop 35 is only slightly smaller than the inner diameter of the bore 36, for example by about 0.0005 inches, so as to be foam tight but still slidingly fit within the bore 36.

As best seen in FIG. 1 and 2, the valving rod assembly 27 with the valving rod 29 and plastic sleeve 56 fits within the bore 36 of cartridge 38. Only one of the two plural component inlet ports is shown. Inlet port 39, when unobstructed as seen in FIG. 2 by the valving rod 29 and its surrounding plastic sleeve 56, permits mixing of the plural components in the mixing chamber portion of bore 36. When the valving rod 29 and its surrounding sleeve 56 are in the forward position, as seen in FIG. 1, the flow of plural components is stopped because the inlet ports (only one of which is shown) are blocked. It is the reciprocating back and forth movement of the valving rod 29 with its preferably generally cylindrically shaped scraper stop 35 that removes any built up or set foam from within the bore 36. The scraper stop 35 could be any cross-sectional shape, as long it conforms to the cross-sectional shape of the bore 36. The shaft 52 similarly could be any appropriate cross-sectional shape, polygonal or cylindrical.

Since the cartridge 38 is all metal, there are not parts that can cold flow to change the tolerance between the outer diameter of the scraper stop 35 and the sleeve 56 surrounding the valving rod 29.

The low friction plastic sleeve 56 can be made from any appropriate low friction type of resilient material such as plastic or a low friction fluoropolymer. It preferably is made of a polytetrafluoroethylene plastic, such as that sold under the brand name TEFLON ®. Since this is the component most likely to wear, the valving rod 29 with its sleeve 56 and the hollow shaft 52 can easily be removed and replaced from the gun or plural component dispensing assembly 10.

Although the plural component dispensing assembly 10 has not been described in detail, it is well know in the art and a further description and the workings of this apparatus is specifically incorporated by reference from the teachings of U.S. Pat. No. 4,708,292, issued Nov. 24, 1987 and assigned to the assignee of the present invention.

While the preferred structure in which the principles of the present invention has been incorporated as shown and described above, it is to be understood that the invention is not to be limited to the particular details thus presented, but in fact, widely different means and structure may be employed in the practice of the broader aspects of this invention. For example, it is to be understood that the instant invention may be equally well employed in a hand held or machine mounted dispensing head. The cartridge 28 would be made of any appropriate nonresilient material, such as ceramic, carbide metal, and stainless or carbon steel or other suitable alloys. The scope of the appended claims is intended to encompass all obvious changes in the details, materials and arrangements of parts which will occur to one of skill on the art upon a reading of this disclosure.

Having thus described the invention, what is claimed is:

1. In a plural component dispensing apparatus for the dispensing of a foam formed from the impingement mixing and reaction of plural components, the improvement comprising in combination:
   (a) a nonresilient mixing chamber having a bore of an inner dimension and at least first and second inlet openings;
   (b) a valving rod reciprocatingly mounted within the bore to move between a first closed position that prevents the flow of plural components through the at least first and second inlet openings and a second open position that permits such flow, the valving rod further having an elongate central portion of a first outer dimension, a first end and an opposing second scraper end, the opposing second scraper end being of a size substantially equal to but slightly less than the inner dimension of the bore and slightly larger than the first outer dimension of the valving rod to slidingly fit within the bore and scrape the bore as the rod reciprocates therethrough; and
   (c) a shaft connected to the valving rod at its first end of a size substantially equal to but slightly less than both the inner dimension of the bore and the size of the opposing second scraper end.

2. The apparatus according to claim 1 wherein the elongate central portion further has a low friction resilient material about at least a portion thereof.

3. The apparatus according to claim 2 wherein the low friction resilient material is hollow and fits about the elongate central portion of the valving rod.

4. The apparatus according to the claim 3 wherein the low friction resilient material sealingly fits against the at least first and second inlet openings in the first closed position to prevent the flow of the plural components into the mixing chamber.

5. The apparatus according to claim 4 wherein the opposing second scraper end is generally cylindrical.

6. The apparatus according to claim 5 wherein the low friction resilient material is plastic.

7. The apparatus according to claim 6 wherein the plastic is a fluoropolymer.

8. The apparatus according to claim 4 wherein the mixing chamber has a generally frustoconical intermediate section through which the at least first and second inlet openings extend.

9. The apparatus according to claim 8 wherein the mixing chamber is an all metal cartridge.

10. A valving rod adapted for reciprocating movement in a bore of a mixing chamber of a plural component dispensing apparatus comprising in combination:
    (a) an elongate central shaft section having a first end and an opposing second end and a first generally uniform cross-sectional dimension;
    (b) a rod section connected to the opposing second end of the central shaft section on a first end and having an opposing second end and a second generally uniform cross-sectional dimension; and
    (c) scraper means for scraping residual plural components from the bore of the mixing chamber of the plural component dispensing apparatus having a third generally uniform cross-sectional dimension located on the opposing second end of the rod section that is substantially the same size as the first cross-sectional dimension, but slightly larger.

11. The apparatus according to claim 10, further comprising a low friction resilient material that encases the rod section between the scraper means and the opposing second end of the central shaft section.

12. The apparatus according to claim 11, wherein the second cross-sectional dimension of the rod section is less than the first cross-sectional dimension of the central shaft section.

13. The apparatus according to claim 12 wherein the scraper means is generally cylindrical in shape and has a generally circular cross section.

14. The apparatus according to claim 13 wherein the elongate central shaft section is generally cylindrical in shape and has a generally circular cross section.

15. The apparatus according to claim 13 wherein the rod section is generally cylindrical in shape and has a generally circular cross section.

16. The apparatus according to claim 10 wherein the central shaft section has an internally threaded recessed portion on the opposing second end.

17. The apparatus according to claim 16 wherein the rod section has a threaded portion on the first end that threadingly engages the internally threaded recessed portion on the opposing second end of the central shaft section.

18. The apparatus according to claim 11 wherein the low friction resilient material encasing the rod section is plastic.

19. The apparatus according to claim 18 wherein the plastic is a fluoropolymer.

* * * * *